United States Patent [19]

Cochran, Jr.

[11] 4,254,451
[45] Mar. 3, 1981

[54] SEQUENTIAL FLASHING DEVICE FOR PERSONAL ORNAMENTATION

[76] Inventor: James A. Cochran, Jr., 452 Hill St., Laguna Beach, Calif. 92651

[21] Appl. No.: 955,325

[22] Filed: Oct. 27, 1978

[51] Int. Cl.³ .............................................. F21L 15/08
[52] U.S. Cl. .................................. 362/103; 315/323; 340/791; 362/800
[58] Field of Search ............................ 362/103–108, 362/800, 811; 340/791, 792, 802; 40/442; 351/51, 158; 315/323, 210

[56] References Cited

U.S. PATENT DOCUMENTS

| | | | |
|---|---|---|---|
| 3,737,647 | 6/1973 | Gomi | 362/104 |
| 3,751,825 | 8/1973 | Barrett | 340/791 X |
| 3,866,035 | 2/1975 | Richey | 362/104 |
| 4,076,976 | 2/1978 | Fenton | 362/104 |
| 4,161,018 | 7/1979 | Briggs et al. | 362/104 |

FOREIGN PATENT DOCUMENTS 491677  9/1938  United Kingdom ............... 362/103

*Primary Examiner*—John Gonzales
*Attorney, Agent, or Firm*—Knobbe, Martens, Olson, Hubbard & Bear

[57] ABSTRACT

An electronic circuit comprised of several integrated circuits sequentially actuates a plurality of light-emitting diodes (LED's) located in an article such as eyeglass frames, which are carried or worn by a person. In one embodiment, an oscillator driven binary up-down counter drives first and second binary to one-of-four decoders. The LED's are arranged in an electrical circuit which allows them to be addressed in X-Y matrix fashion. The first decoder sequentially addresses each "row" of LED's while the second decoder sequentially addresses each "column" of LED's in the matrix so that each LED in the matrix circuit is sequentially flashed. After the entire array of LED's has been sequentially actuated a predetermined number of times, the up-down counter is electronically switched to the opposite state so as to reverse the order in which the LED's are sequentially actuated. In a second embodiment, an integrated circuit binary ripple counter/oscillator drives first and second demultiplexers. The first demultiplexer sequentially actuates the rows of LED's in an X-Y matrix LED circuit, while the second demultiplexer sequentially actuates the columns in the matrix. The demultiplexers may be driven by the ripple counter/oscillator in a manner which allows a less than 100 percent duty cycle, thereby minimizing the drain on the battery power supply. The integrated circuits used are preferably of the complementary metal oxide semiconductor (CMOS) type for minimizing battery drain. When the invention is incorporated in eyeglass frames, the LED circuit is automatically switched on when the temple pieces of the frames are unfolded for wearing, and automatically switched off when the temple pieces are folded for storage.

8 Claims, 16 Drawing Figures

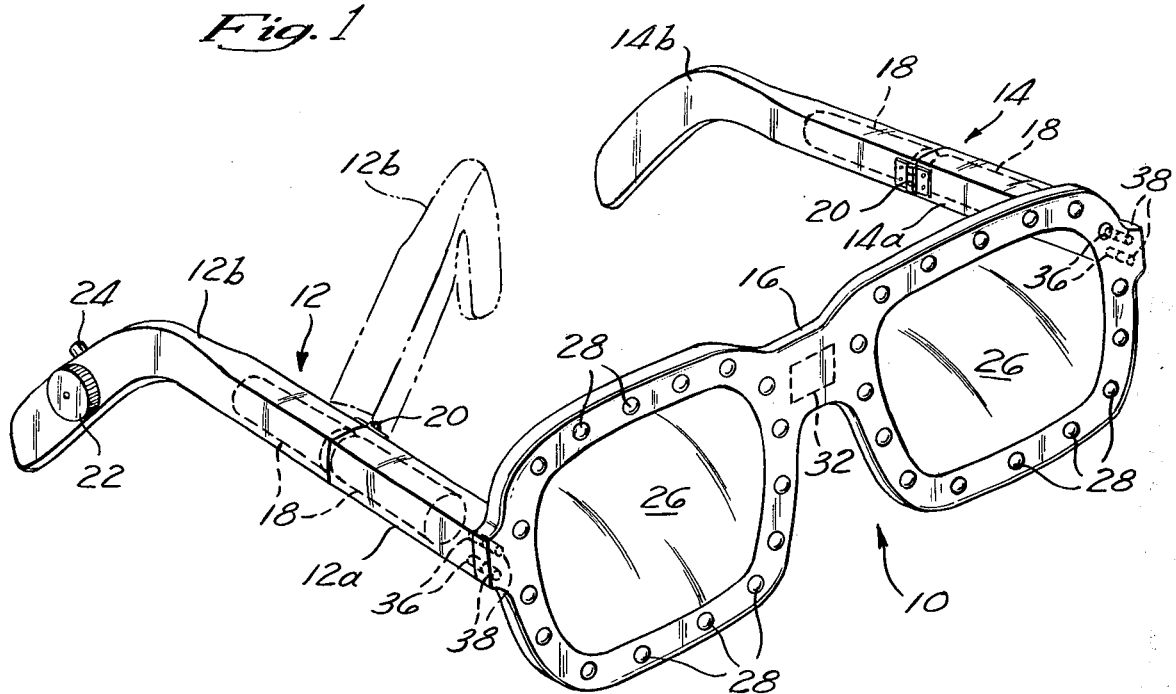
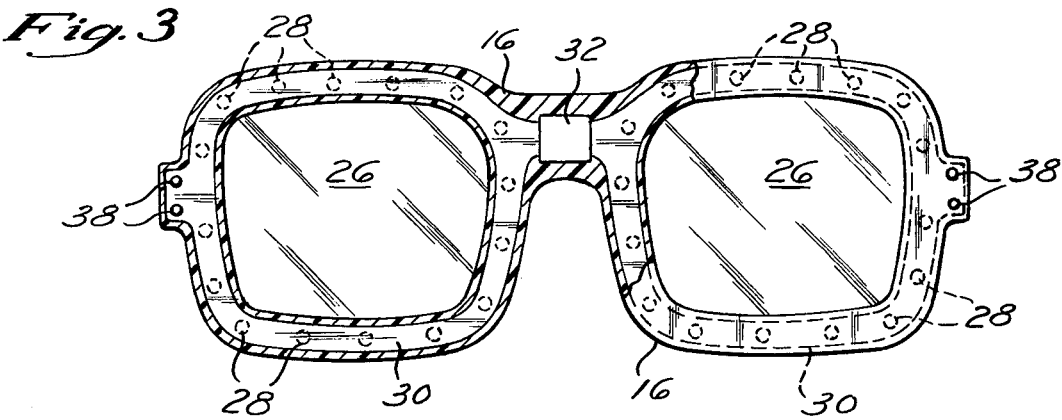
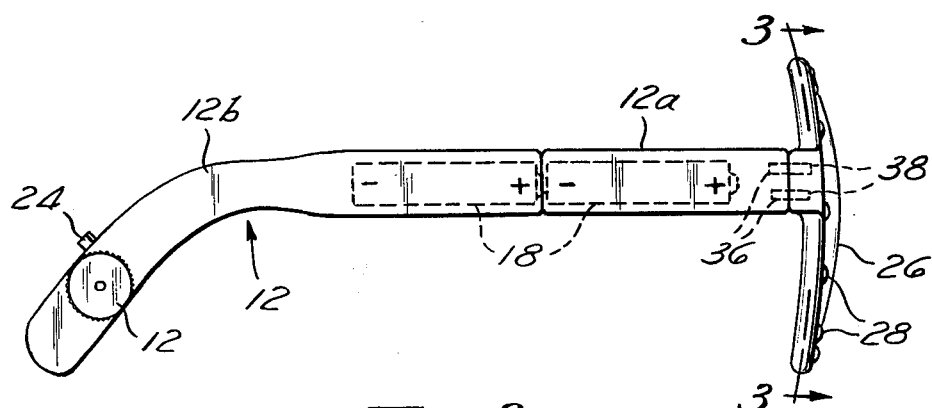

| CLOCK | ENABLE | RESET | ACTION |
|---|---|---|---|
| ↑ | 1 | 0 | INCREMENT COUNTER |
| 0 | ↓ | 0 | INCREMENT COUNTER |
| ↓ | X | 0 | NO CHANGE |
| X | ↑ | 0 | NO CHANGE |
| ↑ | 0 | 0 | NO CHANGE |
| 1 | ↓ | 0 | NO CHANGE |
| X | X | 1 | $Q_1$ THRU $Q_4$ = 0 |

RCA CD4520B
OR
MOTOROLA MC14520B
(X = DON'T CARE)

Fig. 10A

| CARRY IN | U/D | PRESET ENABLE | RESET | ACTION |
|---|---|---|---|---|
| 1 | X | 0 | 0 | NO COUNT |
| 0 | 1 | 0 | 0 | COUNT UP |
| 0 | 0 | 0 | 0 | COUNT DOWN |
| X | X | 1 | 0 | PRESET |
| X | X | X | 1 | RESET |

RCA CD4516B
OR
MOTOROLA MC14516B
(X = DON'T CARE)

Fig. 10B

| INPUTS | | OUTPUTS | | | |
|---|---|---|---|---|---|
| A | B | $Q_3$ | $Q_2$ | $Q_1$ | $Q_0$ |
| 0 | 0 | 0 | 0 | 0 | 1 |
| 0 | 1 | 0 | 0 | 1 | 0 |
| 1 | 0 | 0 | 1 | 0 | 0 |
| 1 | 1 | 1 | 0 | 0 | 0 |

RCA CD4555B
OR
MOTOROLA MC14555B

Fig. 10C

| CONTROL INPUTS | | | ON SWITCHES | |
|---|---|---|---|---|
| INHIBIT | SELECT | | | |
|  | B | A | | |
| 0 | 0 | 0 | $Y_0$ | $X_0$ |
| 0 | 0 | 1 | $Y_1$ | $X_1$ |
| 0 | 1 | 0 | $Y_2$ | $X_2$ |
| 0 | 1 | 1 | $Y_3$ | $X_3$ |

RCA CD4052A
OR
MOTOROLA MC14052B

Fig. 10D

SEQUENTIAL FLASHING DEVICE FOR PERSONAL ORNAMENTATION

BACKGROUND OF THE INVENTION

The present invention relates to devices for personal ornamentation which include one or more flashing light sources. In particular, the invention relates to such devices which use a plurality of sequentially actuated light-emitting diodes (LED's) to achieve the ornamental or decorative effect.

The use of flashing LED's in articles for personal ornamentation is well known. U.S. Pat. No. 3,866,035 to Richey, Jr. and U.S. Pat. No. 4,076,976 to Fenton disclose decorative articles having a light-emitting diode which is flashed on and off by an oscillator circuit. U.S. Pat. No. 3,737,647 to Gomi discloses several electronic mechanisms for actuating a plurality of LED's to achieve a number of different ornamental effects.

Two important considerations are required in designing articles of personal ornamentation using LED's. The first is that the circuitry used to actuate the LED's must be small enough to be unobtrusive and easily concealable so as not to detract from the ornamental or decorative effect. The second consideration is that since the power supply for such circuits must, of necessity be a battery, the circuitry should preferably draw a minimum amount of current so as to minimize the frequency of changing the battery.

The first of the above-mentioned considerations has been met to a large extent by the use of integrated circuits such as disclosed in the above-mentioned Fenton patent. The prior art has attacked the problem of maximizing battery life by using such approaches as relatively low flashing rates, e.g., on the order of less than ten flashes per second. However, this approach is less than totally satisfactory where a high repetition rate for LED flashing is desired, especially where this involves the sequential flashing of a plurality of LED's.

SUMMARY OF THE INVENTION

The present invention produces a striking visual effect by utilizing an array of LED's which are sequentially flashed at a rate which may be varied from low to very high. Typically, repetition rates of between twice per second and 60 times per second can be achieved, the higher end of this range appearing virtually continuous to the human eye. Moreover, the present invention is capable of sequentially flashing two or three dozen or more LED's at relatively high repetition rates with very low battery drain. This is due to the utilization of complementary metal oxide semi-conductor (CMOS) integrated circuits which have the characteristics of moderately high speed and high input impedance.

In one embodiment of the present invention, the basic repetition rate is set by an astable multi-vibrator actuated as a clock generator. This clock signal drives a binary up-down counter which, in turn, drives a pair of binary to one-of-four decoders. The decoders, in turn, drive, through appropriate buffers, an array of LED's which are addressable in X-Y matrix fashion corresponding to "rows" and "columns". One of the decoders sequentially addressess each column, while the other decoder sequentially drives each row of LED's. Thus, the LED array, or grid, is driven in a step-through fashion with the LED's in Column 1 being sequentially flashed, then the LED's in Column 2, etc. After the final LED in the final column is flashed, the sequence begins anew at the first LED in the first column.

This first embodiment also includes a divider circuit which is responsive to the clock signal and which switches the up-down counter to count in the opposite direction after the completion of a predetermined number of cycles of the clock signal, corresponding to a fixed number of complete LED flashing sequences. The reversal of direction of the up-down counter in turn causes the reversal of the sequence in which the LED's are flashed.

A second embodiment of the invention incorporates a ripple-carry binary counter/oscillator which is used to drive a pair of demultiplexers. Again, the LED's are arranged in an array wherein they are addressable in X-Y matrix fashion, with one of the demultiplexers addressing the rows and the other demultiplexer addressing the columns to flash the LED's in the sequential manner described above in connection with the first embodiment. Although this second circuit does not provide for reversing the sequence of LED flashing, it does provide the significant advantage of a 50 percent duty cycle, thus substantially prolonging battery life.

Although the aforementioned circuits can be used in connection with any ornamental article that can be worn on one's person, a particular feature of the invention is the incorporation of this visual array within eyeglass frames, so that the LED's surround the lenses to give a very striking visual effect. With the LED array incorporated within eyeglass frame, the power supplying batteries are contained within hollow temple pieces, while spring-loaded electrical contacts on the temple pieces and the lens-holding portion of the frame are situated so as to contact one another when the temple pieces are unfolded, thus providing for automatic actuation of the LED circuit when the frames are opened for wearing.

BRIEF DESCRIPTION OF THE DRAWINGS

FIG. 1 is a front perspective view of the preferred embodiment of the invention;

FIG. 2 is a side elevational view of the preferred embodiment of the invention taken from the left side of FIG. 1;

FIG. 3 is a cross-sectional view taken along line 3—3 of FIG. 2;

FIGS. 10A, 10B, 10C and 10D illustrate truth tables for several of the integrated circuits used in the present invention.

DETAILED DESCRIPTION OF THE INVENTION

Figure 4:
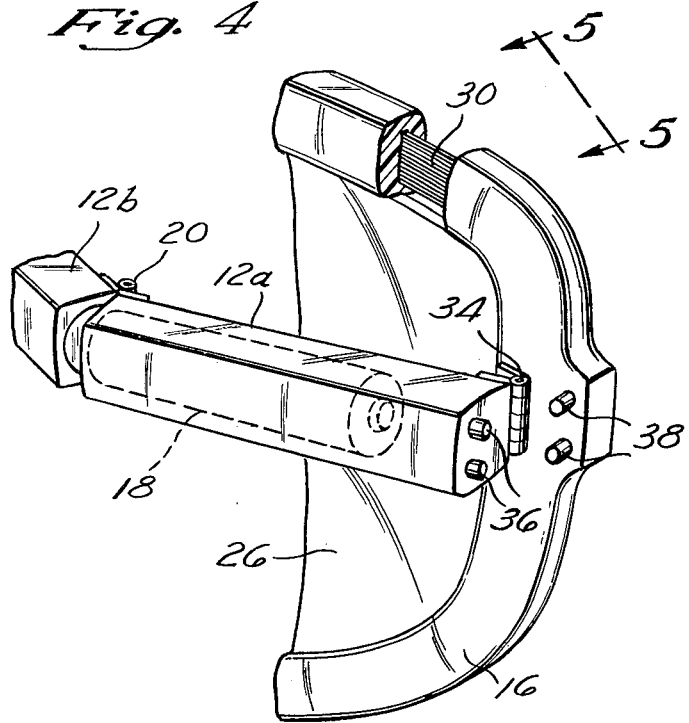
FIG. 4 is an enlarged fragmentary view of the preferred embodiment of the invention, showing the details of the switch structure at the junction between the temple piece and lens holding portion of the eyeglass frame.

A. Structure And Operation Of The Eyeglass Frame

Referring first to FIGS. 1 through 5, the preferred embodiment of the invention is shown. In this embodiment, the invention takes the form of a decorative eyeglass frame 10, having right and left temple pieces 12 and 14 respectively, and a lens-holding portion 16. The temple pieces 12 and 14 are hollow so as to serve as battery holders, each of the temple pieces accommodating a pair of AAA-size pen light batteries 18. To permit insertion and removal of the batteries 18, the temple pieces 12 and 14 are divided into front portions 12a and 14a and rear portions 12b and 14b. The front temple piece portions 12a and 14b are connected to the rear temple piece portions 12b and 14b by means of spring-loaded hinges 20, so that the temple pieces 12 and 14 may be opened as shown in the phantom outline in FIG. 1. The temple pieces 12 and 14 are, of course, provided with suitable battery terminals (not shown). In addition, a flashing speed control dial 22 and an auxiliary on-off switch 24 are fitted onto the rear portion 12b of the temple piece 12. These controls will be more fully discussed hereinafter.

Although not necessary for the purposes of the invention, a pair of lenses 26 may be advantageously held by the lens holding portion 16. The lenses 26 may be sunglass lenses or corrective lenses, depending on the needs of the user. Embedded in the lense holding portion 16 around the periphery of each of the lenses 26 is a plurality of light-emitting diodes (LED's) 28. The precise number of LED's used is not important; however, they preferably completely surround each lens and are spaced relatively close to one another. The LED's are of the type which is encapsulated in a bubble of colored epoxy, such as, for example, the Hewlett Packard Model 5082-4160. This particular type of LED utilizes a tinted, diffused lense which provides high on-off contrast and wide angle viewing, thus contributing to the visual effect. The LED's may be all one color or several colors, whichever is desired.

Figure 5:
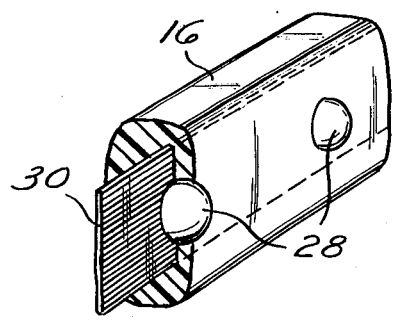
FIG. 5 is an enlarged fragmentary view of a portion of the eyeglass frame of the preferred embodiment of the invention taken along line 5—5 of FIG. 4.

As shown most clearly in FIGS. 3 and 5, the LED's are wired by means of a "flex circuit" 30, which is a flexible ribbon of plastic on which is deposited a plurality of thin strips of conductive material such as copper. Flex circuits, which may be likened to flexible printed circuit boards, are readily available from several manufacturers. Wired to the LED's by means of the flex circuit 30 is a flat pack module 32, which contains a single mask-programmable integrated circuit chip (not shown), having one of the two electronic circuits which will be described hereinafter.

The flex circuit 30 and flat pack module 32 may be embedded within the lense holding portion 16 by any of several well-known techniques. For example, the lense holding portion 16 may be divided vertically, as along the line 3—3 in FIG. 2, with the flex circuit 30 and flat pack module 32 sealed between the adjoining halves of the lens-holding portion 16. The front of the lens-holding portion 16 is, of course, suitably apertured to accommodate the LED's 28.

Another novel feature of the eyeglass frame embodiment of the invention is the circuit-actuating mechanism, best illustrated in FIG. 4. As shown, each of the temple pieces, connected to the lens holding portion 16 by means of a hinges 34, is provided with a pair of spring-loaded power contacts 36 at the end of the temple piece proximate the hinge 34. One of the temple piece power contacts 36 is connected to the positive battery terminal and the other is connected to the negative battery terminal. When the temple pieces are unfolded, the temple piece power contacts 36 make contact with a mating pair of lens-holding portion power contacts 38 on each side of the lens holding portion 16. The lens holding portion power contacts 38 are wired into the flex circuit 30, as best shown in FIG. 3. Thus, when the temple pieces 12 and 14 are in the unfolded position as shown in FIGS. 1 and 3, current will flow from the batteries 18 to the flex circuit 30, while the batteries 18 will be disconnected from the circuit when the temple pieces are folded, as shown in FIG. 4. In this manner, the LED circuit will be automatically turned on when the frames 10 are placed on the wearer's head and will automatically be turned off when the frames are folded for storage. The auxiliary on-off switch 24 is provided to allow the circuit to be turned off while the frame 10 is being worn.

Figure 6A:
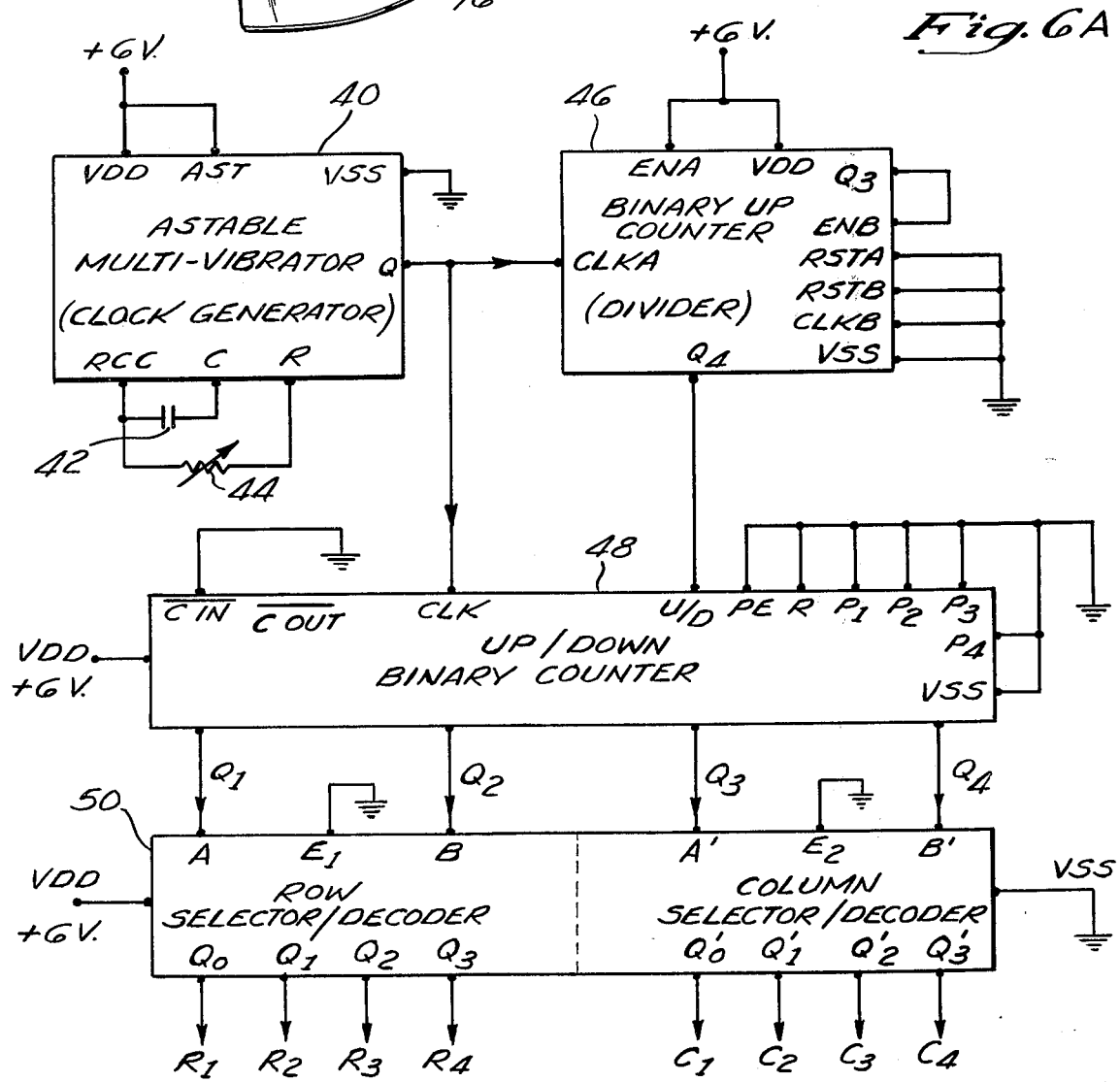
FIG. 6A and FIG. 6B show a first circuit for sequentially flashing the LED's of the invention.
Figure 6B:
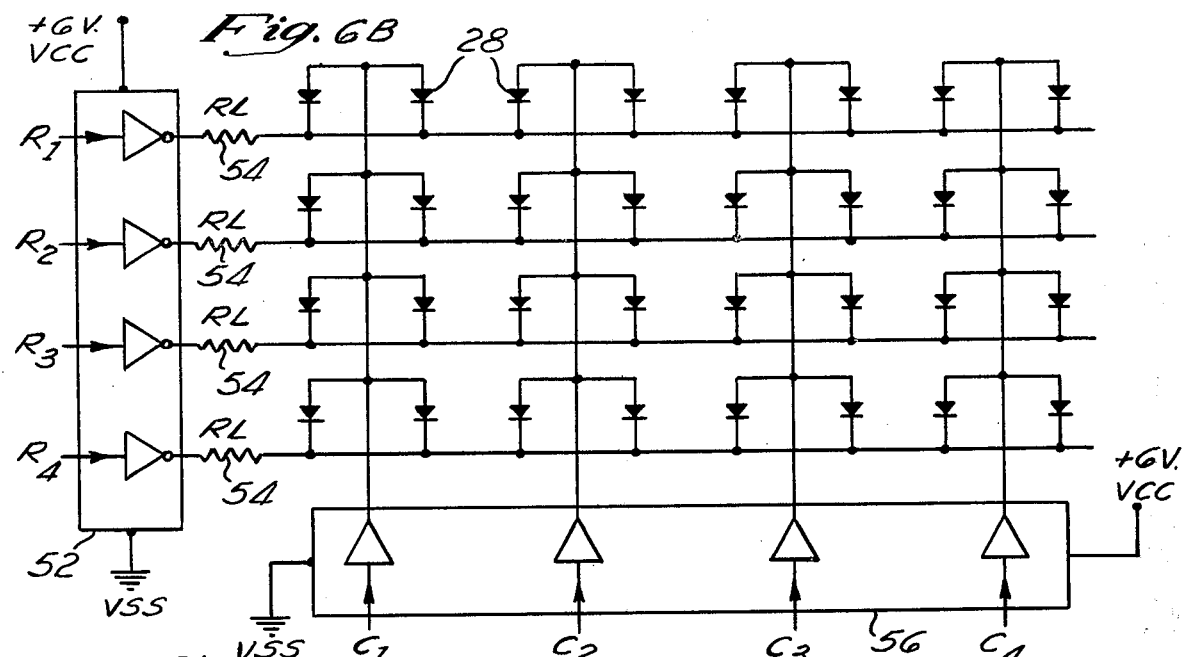

B. Structure And Operation Of The LED-Actuating Circuit Having Automatic Sequence-Reversing FIGS. 6A and 6B illustrate one circuit for the sequential flashing of the LED's 28. As can be seen from the figures, the circuit comprises several subcircuits represented by the various blocks, the functions of each of which can be performed by commercially available complimentary metal oxide semi-conductor (CMOS) integrated circuits. While each of the several subcircuits will be referred to as a separate integrated circuit for the purposes of this description, it is contemplated that the several subcircuits will be combined on a single mask-programmable integrated circuit chip (not shown) contained within the flat pack module 32.

For each of the integrated circuits the high level VDD of the supply voltage is indicated as being 6 volts corresponding to the four 1.5 volt pen light cells 18 connected in series. The low level VSS of the supply voltage is indicated as ground. However, the commercially available CMOS integrated circuits are designed to operate with a supply voltage (VDD-VSS) of between 3 to 15 volts. Accordingly, a wide variety of battery types and configurations may be used to power the circuit.

The basic LED flash repetition rate is established by an astable multi-vibrator 40 which is used as an oscillator to generate a clock signal. An example of such an astable multi-vibrator is the RCA type CD4047B. The multi-vibrator 40 is made to operate in a free running mode by connecting the astable input (AST) to VDD. An external fixed capacitor 42 is connected between the C timing terminal (C) and the RC common terminal (RCC), while an external variable resistor 44 is connected between the R timing terminal (R) and the RC common terminal. The values for the resistor 44 and the capacitor 42 will determine the frequency of the Q output clock signal which in turn determines the repetition rate of LED flashing. By changing the value of the variable resistor 44 the frequency of the Q output clock signal and thus the LED flashing repetition rate can be varied. Accordingly, the previously mentioned flashing speed control dial 22 is provided to vary the resistance of the variable resistor 44.

The Q output clock signal is simultaneously fed into a binary up counter 46 which is used as a divider, and a binary up/down counter 48. The binary up counter 46 having the truth table illustrated in FIG. 10A, may advantageously be a Motorola type MC14520B or RCA type CD4520B dual up counter or equivalent. The Enable A input (ENA) of the dual up counter is connected to VDD while the clock A input (CLKA) is driven by the Q output clock signal. With this configuration, the Q3 output will be ⅛ the frequency of the input to CLKA, which is the Q output clock signal from the multi-vibrator 40. The Q3 output signal is fed into the Enable B input terminal (ENB), and with the clock B input (CLKB) grounded, the Q4 output will be 1/16 the frequency of the Q3 signal, thus being 1/128 the frequency of the Q output clock signal from the multi-vibrator 40. In this manner, the up counter 46 will function as a divide by 128 circuit, with the Q4 output signal changing state every 128 cycles of the Q output clock signal from the multi-vibrator 40. All other terminals of the dual upcounter are grounded as shown.

The binary up/down counter 48 which has the truth table illustrated in FIG. 10B, may be, for example RCA type CD4516B or Motorola type MC14516B or equivalent. The clock signal from the Q output of the multi-vibrator 40 is fed into the clock input (CLK) of the up/down counter 48, causing the up/down counter to count in a first direction. The Q4 output signal from the binary up counter or divider 46 is fed into the up/down input (U/D) of the up/down counter 48. The signal received at the U/D terminal of the up/down counter 48 changes state every 128 cycles of the clock signal from the multi-vibrator 40, and every time such a change of state occurs, the up/down counter will commence counting in the opposite direction. Thus, the up/down counter 48 will count up for 128 cycles of the clock signal and then reverse and count down for 128 cycles.

Figure 7A:
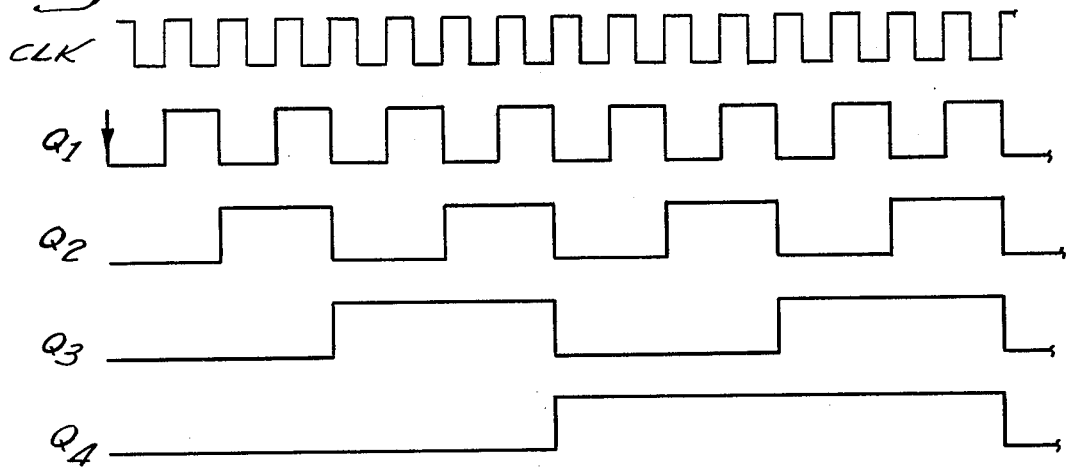
FIGS. 7A, 7B and 7C display various waveforms produced in the circuit of FIGS. 6A and 6B.

The up/down counter 48 has four outputs labeled Q1, Q2, Q3 and Q4. The frequency of the Q1 output signal is ½ that of the clock signal; the Q2 output is ¼ the frequency of the clock signal; the Q3 output is ⅛ the frequency of the clock signal and the Q4 signal is 1/16 the frequency of the clock signal, as shown in FIG. 7A. These output signals Q1 through Q4 are fed into a dual binary to one of four decoder 50 such as the RCA type CD4555B or Motorola type MC14555B or equivalent. The truth table for this type of circuit is illustrated in FIG. 10C.

As its name implies, the dual decoder 50 actually comprises two decoder circuits. One-half of the decoder 50 is used as a row selector and has the Q1 signal from the binary up-down counter 48 fed into the A input and the Q2 signal from the up-down counter fed into the B input. Using the truth table of FIG. 10C and remembering that the frequency of Q2 is one-half the frequency of Q1, it will be seen that the row selector will sequentially select each of the four row selector outputs Q0, Q1, Q2 and Q3. The other half of the dual binary to one of four decoder 50 is used as a column selector in an analogous manner. The Q3 output signal from the binary up-down counter 48 is fed into the A' input, while the Q4 output signal from the up-down counter 48 is fed into the B' input of the decoder 50. Since the frequency of the Q4 signal from the up-down counter 48 is one-half the frequency of the Q3 output signal from the up-down counter, the column selector portion of the decoder 50 will sequentially select each of the four outputs Q0', Q1', Q2' and Q3'.

As can be seen from FIG. 6B, the LED's 28 are arranged in a circuit addressable as a four by four X-Y matrix or grid. There are four rows denominated R1, R2, R3 and R4 and four columns denominated C1, C2, C3 and C4. At each address on the grid there are two LED's wired in parallel. One of each parallel pair of LED's at each point of the matrix is located on the left side of the lens holding portion 16 of the frame 10 and the other LED of the pair is on the right side of the lens holding portion. Thus, when a particular location on the matrix or grid is addressed, two LED's, one on the left side of the frame and one on the right side, will be lit simultaneously.

The row selector portion of the decoder 50 drives the rows R1 through R4 from the outputs Q0 through Q3, respectively, through an inverting buffer 52, such as an RCA TYPE CD4049B or Motorola type MC14049B or equivalent. A load resistor 54 is connected between each output of the inverting buffer 52 and each row of LED's. The columns C1 through C4 of LED's are driven by the outputs Q0' through Q3' of the column selector portion of the decoder 50 through a non-inverting buffer 56, such as an RCA type CD4050B or Motorola type MC14050B or equivalent. The power supply VCC for each of the buffers 52 and 56 is the same 6 volt power supply used for the other integrated circuits.

Figure 7B:
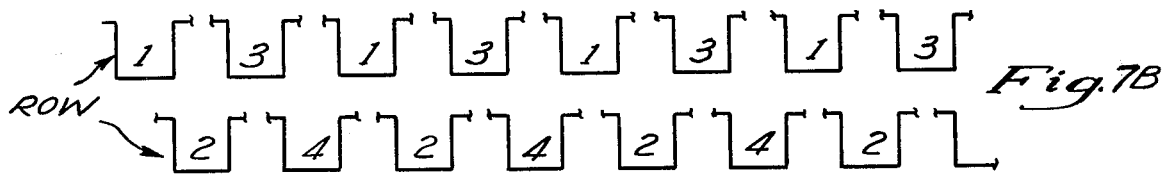
Figure 7C:
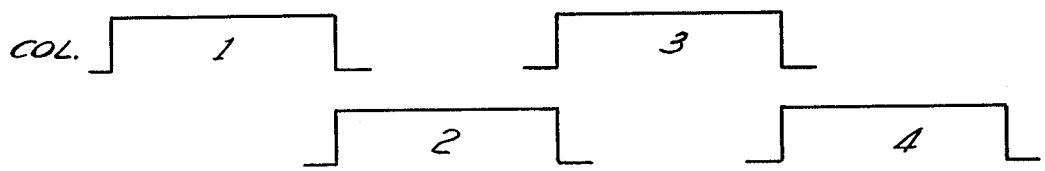

FIG. 7B shows the output of the inverting buffer 52, indicating that each row R1, R2, R3 and R4 is sequentially addressed. Because the outputs Q3 and Q4 of the up-down counter 48 have one-fourth the frequency of outputs Q1 and Q2 respectively, each of the four rows R1 through R4 will be addressed while the first column C1 receives a high logic level, thus sequentially switching on the four LED pairs in Column 1. Then the next column C2 is addressed with a high logic level while the four rows R1 through R4 are sequentially addressed in step-through fashion, and so on until the final column C4 receives a high logic level while the four rows are sequentially addressed. This sequencing can best be understood by reference to FIGS. 7B and 7C. Thus, the sequence will be as follows: R1C1, R2C1, R3C1, R4C1, R1C2, R1C2, R3C2, R4C2, R1C3, R2C3, R3C3, R4C3, R1C4, R2C4, R3C4, R4C4.

When the LED pair at R4C4 has been switched on, the sequence starts anew at R1C1. After the complete sequence has been run through a total of 8 times, the sequence is reversed, thereby reversing the order in which the LED's are actuated. This occurs because the up counter/divider 46 causes the up-down counter 48 to reverse direction every 128 cycles of the clock signal, corresponding to 8 full sequences through the 16 LED addresses in the LED matrix.

Referring to FIGS. 3 and 6B, let us assume that the LED pair at R1C1 of FIG. 6B corresponds to the pair of LED's 28 closest to the flat-pack module 32 on either side of it, as shown in FIG. 3. Then, if it is desired to flash the LED's in clockwise order, for example, around each of the lenses 26, the LED pair at R2C1 of FIG. 6B will correspond to the next adjacent LED below the leftward of the R1C1 pair, and the next adjacent LED above and to the right of the rightward of the R1C1 pair. In this configuration then, as the flashing sequence progresses from R1C1 through R4C4, the LED's will flash in clockwise order around each of the lenses 26. If desired, the LED's can be arranged to flash in clockwise order around one lens and in counter-clockwise order around the other lens, in either case the flashing order being reversed, as described above, every eight complete sequences.

C. Structure And Operation Of The 50% Duty-Cycle Circuit

Figure 8:
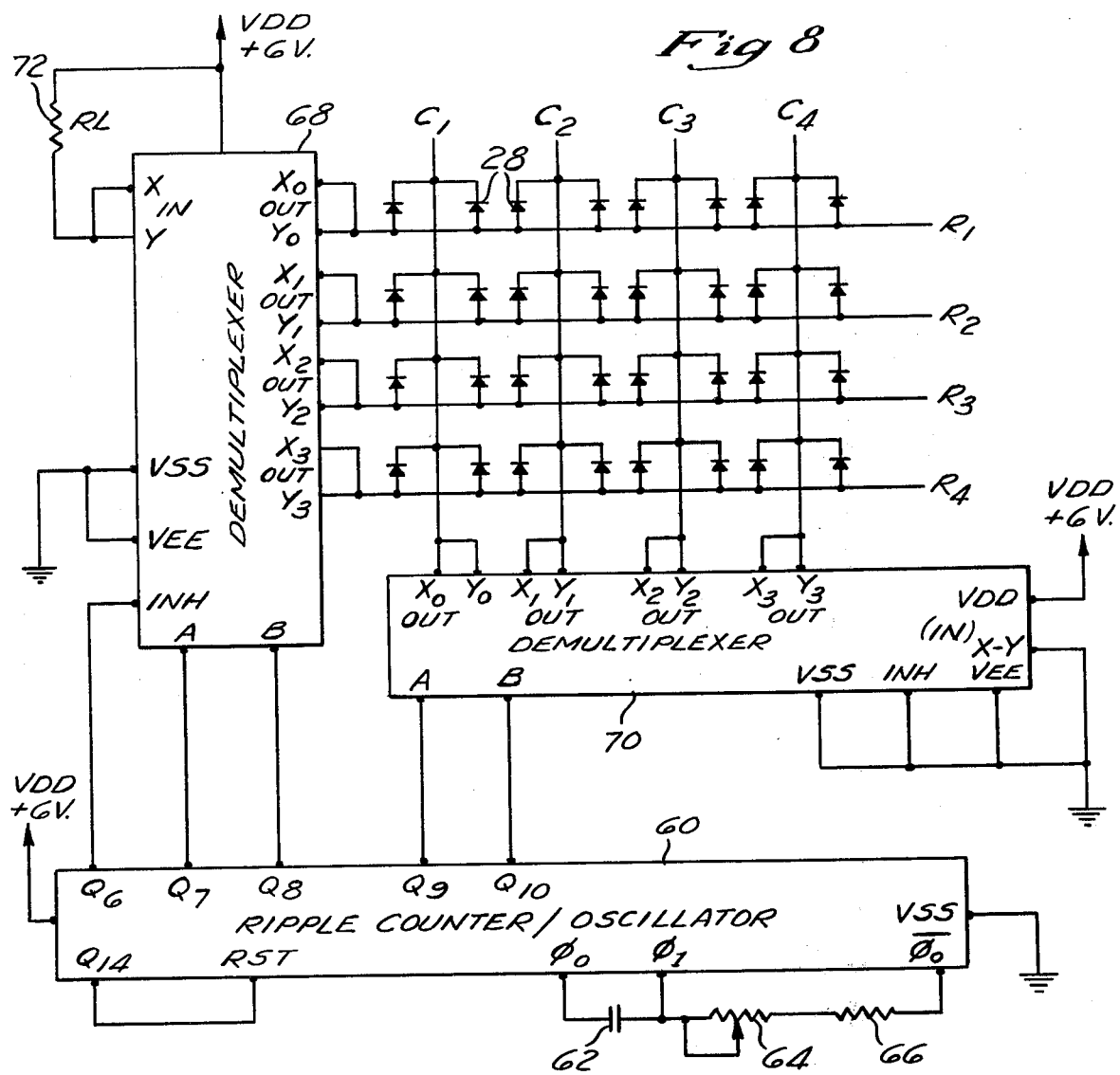
FIG. 8 shows a second circuit for sequentially flashing the LED's of the invention.

A second circuit for sequentially actuating the LED is illustrated in FIG. 8. Like the first circuit previously described, this circuit utilizes several CMOS integrated circuits powered by the 6 volts supplied by the four pen light cells 18.

In this circuit the basic repetition rate for LED flashing is set by a ripple-carry binary counter/divider/oscillator 60 such as an RCA Model CD4060B or equivalent. In this circuit the ripple counter 60 is used as an oscillator and it is programed to perform this function by connecting an external fixed capacitor 62 between the $\phi_0$ and the $\phi_1$ input terminal and an external resistance between the $\phi_1$ and $\overline{\phi_0}$ input terminals. The resistance is preferably a variable resistor 64 in series with a fixed resistor 66. Thus the capacitor 62 and the resistors 64, 66 will establish an RC time constant to set the basic clock signal frequency. As in the first circuit previously described, the frequency of the clock signal, and therefore the LED flashing repetition rate, can be changed by varying the resistance of the variable resistor 64 by means of the flashing speed control dial 22.

Four outputs from the ripple counter/oscillator are used: Q7, Q8, Q9 and Q10. The Q8 signal has one half the frequency of the Q7 signal; and Q9 signal has one half the frequency of the Q8 signal; and the Q10 signal has one half the frequency of the Q9 signal. These output signals are fed into a pair of identical four channel demultiplexers 68 and 70 such as the RCA type CD4052B or Motorola type MC14052B or equivalent. A truth table for this type of logic chip is shown in FIG. 10D.

The Q7 and Q8 outputs from ripple counter/oscillator 60 are fed into the A and B inputs respectively of the demultiplexer 68 while the outputs Q9 and Q10 are fed into the A and B inputs respectively of the demultiplexer 70. The LED's 28 are arranged in a similar four by four matrix or grid addressable in X-Y matrix fashion as in the first circuit previously described. The demultiplexer 68 addresses the rows of the matrix while the demultiplexer 70 addresses the columns. The demultiplexers 68 and 70 perform an analogous function to the decoder 50 in the previously described circuit. That is, the row demultiplexer 68 sequentially selects each of the rows of LED's while the column demultiplexer 70 sequentially selects the columns. This function can be understood by reference to the truth table in FIG. 10D and the wave forms in FIGS. 9A and 9B. Thus since the frequency of the Q8 signal is one half the frequency of the Q7 signal, it can been seen from the truth table of FIG. 10D that the row demultiplexer 68 will sequentially address each of the rows R1 through R4 in step through fashion. Similarly since the frequency of the Q10 signal is one half the frequency of the Q9 signal the column demultiplexer 70 will sequentially address each of the columns C1 through C4 in step through fashion.

Because of the previously described frequency relationships between the outputs Q7 through Q10 of ripple counter/oscillator 60 each column will be addressed for a period which is long enough for all four rows to be addressed sequentially. This relationship is best understood by references to FIGS. 9A and 9B. Thus the sequence in which the LED pairs are switched on by this circuit is identical to that in the previously described circuit. That is column 1 is addressed while rows 1 through 4 are sequentially addressed, followed by column 2, rows 1 through 4, etc. Finally, column 4 row 4 is addressed and the sequence begins anew at column 1 row 1 due to the connection of output Q14 of the ripple counter/oscillator 60 to the reset terminal (RST) thereof.

Figure 9A:
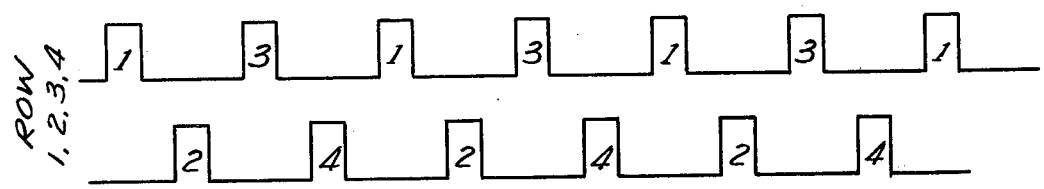
FIGS. 9A and 9B display various waveforms produced by the circuit of FIG. 8.
Figure 9B:
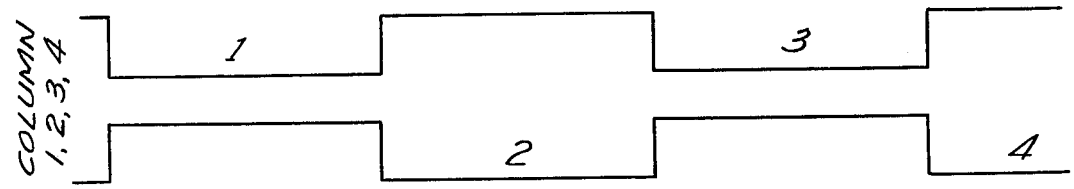

Although this second circuit does not perform an automatic sequence-reversing function, it does have the significant advantages of relative simplicity and the ability to operate on a 50 percent duty cycle, as shown in FIG. 9A. This is due to the connection between the inhibit terminal (INH) of the row demultiplexer 68 and the Q6 output terminal of the ripple counter/oscillator 60. The frequency of the Q6 output signal is twice that of the Q7 output signal. Every time the inhibit input of the row demultiplexer 68 receives a pulse from the Q6 output of the ripple counter/oscillator 60, all outputs of the row demultiplexer 68 are effectively open-circuited, so that even if a column is being addressed by the column demultiplexer 70 no current will flow through the LED's. Because the frequency of the output signal Q6 is twice the frequency of the output signal Q7 from the ripple counter/oscillator 60, the inhibit function will occur twice for each cycle of the Q7 output, thereby yielding a 50 percent duty cycle as shown in FIG. 9A.

A load resistor 72 is connected between the high value of the supply voltage VDD and the X-Y input of the row demultiplexer 68 in order to produce the proper level of current for actuating the LED's.

With a 50% duty cycle, after a pair of LED's is flashed, there will follow a period of time during which there will be no LED's lit. This period will be equal to the length of time during which a pair of LED's is lit. For example, if a pair of LED's is lit for 100 milliseconds, there will follow a 100 millisecond period of time when no LED's are lit. This is in contrast to the first circuit, which has a 100% duty cycle, so that a pair of LED's is lit as soon as the previous pair in the sequence is switched off, and there is, therefore, no period of time during the flashing sequence when there is not at least one pair of LED's lit.

At higher repetition rates with a 50% duty cycle, the LED's may appear somewhat dimmer. To compensate for this, it may be desirable to reduce the resistance of the load resistor 72, thereby allowing a higher current through the LED's to increase their brightness.

Although it is possible to achieve a 25% duty cycle by connecting the INH terminal of the row demultiplexer to the Q5 output (not shown) of the ripple counter/oscillator 60, such a low duty cycle would result in too much "off" time at low repetition rates, and too dim a light at high repetition rates, for achieving the desired striking visual effect. Accordingly, it has been determined that a 50% duty cycle achieves an optimum balance of battery life and visual effect.

What is claimed is:

1. A device for producing a visual effect through the sequential flashing of light-emitting elements, comprising:
    (a) an eyeglass frame having a pair of temple pieces foldably attached by hinges to a lens-holding portion;
    (b) a plurality of light-emitting elements disposed in said lens-holding portion, said light-emitting elements being arranged in a circuit configuration wherein they are addressable in X-Y matrix fashion corresponding to the rows and columns of an X-Y matrix;

(c) means in at least one of said temple pieces for holding a battery to supply current to said light-emitting elements;

(d) electronic switching means in said frame for driving the rows and columns of said matrix at different rates to sequentially actuate said light-emitting elements with current from said battery; said switching means sequentially addressing each row and column in said matrix, all of said rows being sequentially addressed while each individual column is addressed, said switching means comprising:

oscillator means for generating a clock signal;

means responsive to said clock signal for generating a plurality of output signals having a fixed frequency relationship to said clock signal and to each other;

binary row selector means, responsive to a first pair of said output signals having the highest frequencies, for sequentially addressing each row in said matrix in step-through fashion in response to the frequency relationship between said first pair of output signals;

binary column selector means, responsive to a second pair of said output signals, for sequentially addressing each column in said matrix in step-through fashion in response to the frequency relationship between said second pair of output signals;

means responsive to said clock signal for generating a sequence-reversing signal after a predetermined number of cycles of said clock signal; and means responsive to said sequence-reversing signal for reversing the order in which said row selector means and said column selector means address said rows and columns of said matrix; and (e) means for electronically connecting said battery to said switching means in response to the unfolding of said temple pieces about said hinges when said frames are worn by a person.

2. The device of claim 1, wherein said light-emitting elements are light-emitting diodes.

3. The device of claim 1, further comprising:
(a) means for varying the repetition rate at which said light-emitting elements are actuated.

4. A device for producing a visual effect through the sequential flashing of light-emitting elements, comprising:
(a) a plurality of light-emitting elements arranged in a circuit configuration wherein they are addressable in X-Y matrix fashion corresponding to rows and columns of an X-Y matrix;
(b) means for mounting said light-emitting elements in a visually attractive setting, said mounting means including means for holding a battery to supply current to said light emitting elements; and
(c) electronic switching means in said mounting means for sequentially actuating said light-emitting elements with current from said battery, said switching means sequentially addressing the rows and columns in said matrix at different rates, all of said rows being sequentially addressed while each individual column is addressed, said switching means comprising:

oscillator means for generating a clock signal;

means responsive to said clock signal for generating a plurality of output signals having a fixed frequency relationship to said clock signal and to each other;

binary row selector means responsive to a first pair of said output signals having the highest frequencies, for sequentially addressing each row in said matrix in step-through fashion in response to the frequency relationship between said first pair of output signals;

binary column selector means responsive to a second pair of said output signals, for sequentially addressing each column in said matrix in step-through fashion in response to the frequency relationship between said second pair of output signals;

means responsive to said clock signal for generating a sequence-reversing signal after a predetermined number of cycles of said clock signal; and means responsive to said sequence-reversing signal for reversing the order in which said row selector means and said column selector means address said rows and columns in said matrix.

5. The device of claim 4, further comprising:
means for varying the frequency of said clock signal.

6. The device of claim 4, wherein said mounting means comprises an eyeglass frame.

7. A device for sequentially actuating a plurality of light-emitting elements arranged in a circuit configuration wherein said elements are addressable in X-Y matrix fashion corresponding to rows and columns in an X-Y matrix, said device comprising:
(a) oscillator means for generating a clock signal;
(b) means responsive to said clock signal for generating a plurality of output signals having a fixed frequency relationship to said clock signal and to each other;
(c) binary row selector means, responsive to a first pair of said output signals having the highest frequencies, for sequentially addressing each row in said matrix in step-through fashion in response to the frequency relationship between said first pair of output signals;
(d) binary column selector means, responsive to a second pair of said output signals having lower frequencies than said first pair, for sequentially addressing each column in said matrix in step-through fashion in response to the frequency relationship between said second pair of output signals, said rows and columns being addressed at different rates so that all of said rows are sequentially addressed while each individual column is addressed;
(e) means responsive to said clock signal for generating a sequence-reversing signal after a predetermined number of cycles of said clock signal; and
(f) means responsive to said sequence-reversing signal for reversing the order in which said row selector means and said column selector means address said rows and columns.

8. The device of claim 7, further comprising:
means for varying the frequency of said clock signal.

* * * * *

UNITED STATES PATENT AND TRADEMARK OFFICE
CERTIFICATE OF CORRECTION

PATENT NO. : 4,254,451

DATED : March 3, 1981

INVENTOR(S) : James A. Cochran, Jr.

It is certified that error appears in the above-identified patent and that said Letters Patent are hereby corrected as shown below:

Column 3, line 67, "hinges" should be "hinge"

Column 6, line 41, the second "R1C2" should be "R2C2".

Signed and Sealed this

Twenty-second Day of September 1981

[SEAL]

Attest:

GERALD J. MOSSINGHOFF

Attesting Officer    Commissioner of Patents and Trademarks